(12) United States Patent
Gupta et al.

(10) Patent No.: US 12,175,381 B1
(45) Date of Patent: Dec. 24, 2024

(54) SPECIALIZED ARTIFICIAL-INTELLIGENCE ARCHITECTURES FOR PREDICTING USER BEHAVIOR WITH RESPECT TO AN OBLIGATION

(71) Applicant: Lendbuzz, Inc., Boston, MA (US)

(72) Inventors: Otkrist Gupta, Somerville, MA (US); Dan Raviv, Newton, MA (US)

(73) Assignee: Lendbuzz, Inc., Boston, MA (US)

( * ) Notice: Subject to any disclaimer, the term of this patent is extended or adjusted under 35 U.S.C. 154(b) by 1009 days.

(21) Appl. No.: 17/155,811

(22) Filed: Jan. 22, 2021

(51) Int. Cl.
*G06N 5/04* (2023.01)
*G06F 16/28* (2019.01)
*G06F 40/205* (2020.01)
*G06F 40/279* (2020.01)
*G06N 20/20* (2019.01)
*G06Q 40/12* (2023.01)

(52) U.S. Cl.
CPC ............. *G06N 5/04* (2013.01); *G06F 16/285* (2019.01); *G06F 40/205* (2020.01); *G06F 40/279* (2020.01); *G06N 20/20* (2019.01); *G06Q 40/12* (2013.12)

(58) Field of Classification Search
CPC combination set(s) only.
See application file for complete search history.

(56) References Cited

U.S. PATENT DOCUMENTS

| | | | | |
|---|---|---|---|---|
| 6,993,193 B2* | 1/2006 | Smith | ............... | G06V 10/764 |
| | | | | 382/150 |
| 2012/0265655 A1* | 10/2012 | Stroh | ................. | G06Q 40/00 |
| | | | | 705/30 |
| 2018/0232650 A1* | 8/2018 | Dilip | ..................... | G06N 20/00 |
| 2018/0285459 A1* | 10/2018 | Soni | ....................... | G06F 16/93 |
| 2019/0066020 A1* | 2/2019 | Allen | .................... | G06F 16/285 |
| 2019/0197013 A1* | 6/2019 | Chen | ................... | G06F 18/2453 |
| 2019/0332920 A1* | 10/2019 | Sermanet | ................ | G06N 3/08 |
| 2020/0302524 A1* | 9/2020 | Kamkar | ............... | G06Q 10/067 |

* cited by examiner

*Primary Examiner* — Omar F Fernandez Rivas
*Assistant Examiner* — Corey M Sackalosky
(74) *Attorney, Agent, or Firm* — Kilpatrick Townsend & Stockton LLP

(57) ABSTRACT

The present disclosure generally relates to techniques for constructing a specialized artificial-intelligence (AI) architecture. The present disclosure relates to techniques for optimizing hyperparameters of the specialized AI architecture using reinforcement learning models, and generating a prediction of a user's behavior with respect to an obligation by executing the specialized AI architecture with the optimized hyperparameters. The specialized AI architecture can include a pre-processing layer that extracts features from unstructured user data and normalizes the features, a classifier layer that classifies users, and a normalization layer that normalizes the classifications of users.

17 Claims, 8 Drawing Sheets

SPECIALIZED ARTIFICIAL-INTELLIGENCE ARCHITECTURES FOR PREDICTING USER BEHAVIOR WITH RESPECT TO AN OBLIGATION

TECHNICAL FIELD

The present disclosure generally relates to techniques for constructing a specialized artificial-intelligence (AI) architecture that includes various AI models. More specifically (but not by way of limitation), the present disclosure relates to techniques for optimizing hyperparameters of the AI models included in the specialized AI architecture, and normalizing outputs of the specialized AI architecture to generate predictions of user behavior with respect to obligations.

BACKGROUND

AI systems can be used to model and predict user behavior. A technical challenge often arises, however, in certain AI systems, such as deep neural networks. Due to the black-box nature of certain AI systems, the final trained model that is used for prediction can suffer from variance. For example, each time a deep neural network is trained using the same training data, a slightly different set of parameters is generated, and thus, a slightly different prediction may be outputted by the final trained model. A trained deep neural network can generate varying outputs for the same input.

Additionally, AI systems that are used to model and predict user behavior often extract features from user data. The extracted features are used as input to the AI systems. A technical challenge arises, however, in certain feature extraction models. Extracting features that are useful for the purpose of modeling and predicting user behavior is technically challenging; for example, when the features are extracted from unstructured information, such as electronic or paper documents.

SUMMARY

Certain aspects and features of the present disclosure relate to a system. The system can include one or more processors and a non-transitory computer-readable medium. The non-transitory computer-readable medium can be communicatively coupled to the one or more processors and can store program code executable by the one or more processors. The program code can, when executed, implement a behavior prediction system configured to predict a behavior of a user with respect to an obligation. The behavior prediction system can include a natural language processing (NLP) layer, a concatenation layer, and a nearest-neighbor layer. The NLP layer can be configured to extract one or more feature groups associated with the user from unstructured user data associated with the user. The concatenation layer can be configured to generate a user input vector using the unstructured user data. The user input vector can represent the one or more feature groups associated with the user. A set of trained machine-learning models can be configured to receive the user input vector and generate an ensembled output predicting the behavior of the user with respect to the obligation. Each trained machine-learning model of the set of trained machine-learning models can include a density estimator configured to generate a probability vector corresponding to the user. The set of trained machine-learning models can be configured to generate the ensembled output based on a combination of the probability vector outputted by each density estimator. The nearest-neighbor layer can be configured to receive the user input vector and determine a set of nearest neighbors to the user. Each nearest neighbor of the set of nearest neighbors can correspond to another user who has satisfied or defaulted on another obligation. An identifier for each of the set of nearest neighbors can be presented on an interface. Other embodiments of this aspect include corresponding computer systems, apparatus, and computer programs recorded on one or more computer storage devices, each configured to perform the actions of the methods.

Certain aspects and features of the present disclosure can also relate to a computer-implemented method for performing part or all of one or more operations or processes disclosed herein.

Certain aspects and features of the present disclosure can also relate to a computer-program product that is tangibly embodied in a non-transitory machine-readable storage medium and that includes instructions configured to cause one or more data processors to perform part or all of one or more methods, processes, or operations disclosed herein.

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below; not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
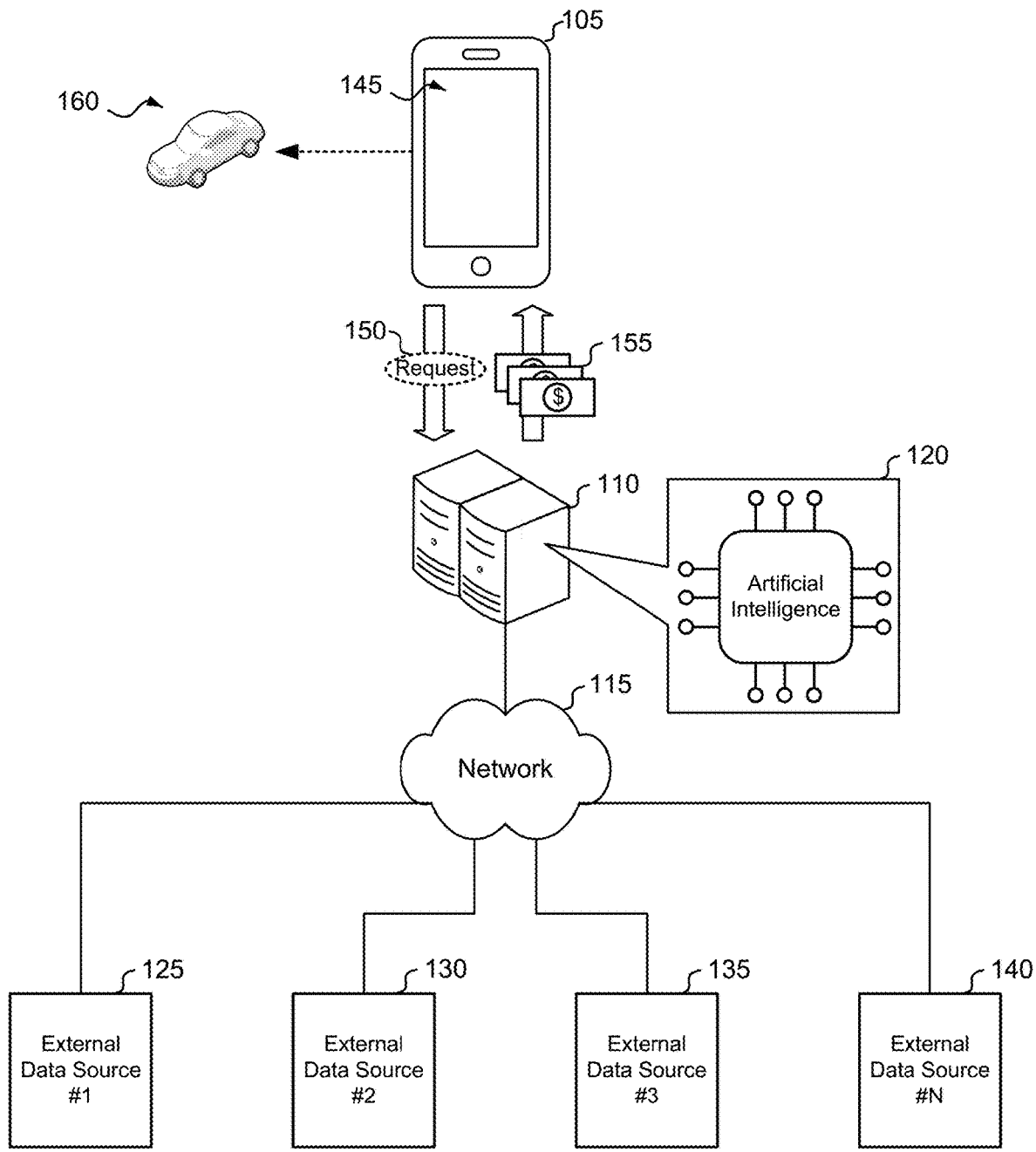
FIG. 1 is a block diagram illustrating an example of a network architecture of a behavior prediction system, according to certain aspects of the present disclosure.

Certain aspects and features of the present disclosure relate to a specialized AI architecture configured to predict a user behavior with respect to an obligation. A user device can transmit a communication to a behavior prediction system. The communication can include a request to initiate an obligation. The behavior prediction system can execute the specialized AI architecture to process the request and generate a response to the request. The response can include an approval or a denial of the request. Processing the request can include generating an output that indicates a predicted user behavior with respect to the obligation. The behavior prediction system can generate the response based on the predicted user behavior with respect to the obligation. User behaviors can include a user satisfying the obligation or not satisfying the obligation. For example, an obligation can include a loan (e.g., for a car). Satisfying the obligation can include repaying the loan amount in full, and not satisfying the obligation can include defaulting on the loan. Accordingly, the specialized AI architecture can be configured to predict a degree to which a user is likely to satisfy the obligation (or, alternatively, any obligation generally). The specialized AI architecture can also be configured to detect other users who are similar to the user. Similarity between users can be determined by executing a nearest-neighbor model.

In some implementations, the specialized AI architecture can be configured to receive unstructured user data that characterizes aspects of a user. For example, unstructured user data can include an electronic document that indicates a set of previous transactions performed by the user (e.g., as in a bank statement). The specialized AI architecture can be configured to extract strings of text from the unstructured user data using a parsing template. For example, a parsing template can be executable code that, when executed, extracts strings of text from specific locations of an electronic document. The strings of text can include text descriptions of transactions performed by the user. The specialized AI architecture can also include a natural-language-processing (NLP) model that is trained to classify the individual words of each text description into categories. For example, each category can represent a spending behavior or an attribute of a transaction. Additionally, the specialized AI architecture executes feature extraction techniques to extract feature groups from the categorized words. A feature group can include one or more features extracted from the words classified by the NLP model. The extracted feature groups can be used to train the various AI models included in the specialized AI architecture.

The specialized AI architecture can also include a pre-processing layer that rescales, normalizes, and reduces the features included in each feature group. The pre-processing layer achieves a technical improvement to the functioning of a server that executes the specialized AI architecture. For example, the rescaling, normalizing, and reduction of features in each feature group cause a reduction in the amount of memory needed to train the various AI models of the specialized AI architecture, thereby achieving faster training times and other improvements in performance. The output of the pre-processing layer can be a user input vector including a concatenation of features that characterize the user.

The specialized AI architecture can include a classifier model that evaluates the user input vector to predict the behavior of the user with respect to satisfying or not satisfying the obligation requested. The outputs of the classifier model for some or all users can be normalized using a kernel density estimator. For example, the output of the kernel density estimator can represent a normalized probability that the user will default on the obligation in the future. The specialized AI architecture can then perform K-fold cross validation using separate subsets of the training data set to train each model of the K-fold cross validation. As a technical improvement, however, the specialized AI architecture can ensemble the various outputs of each AI model constructed during the K-fold cross validation. Ensemble learning is a technique for combining (e.g., averaging) the output of several machine-learning models. Ensembling the various outputs of each model can reduce a variance of the outputs of the specialized AI architecture, which improves the accuracy of predictions. The ensembled output can represent a prediction of a degree to which the user is likely to satisfy the obligation or default on the obligation.

The output of classifier models, such as deep neural networks, however, can experience variance. The variance of classifications predicted by the deep neural networks reduces an overall prediction accuracy of AI models. Certain aspects of the present disclosure can improve the server in executing the specialized AI architecture by solving the performance issues of the AI models included in the specialized AI architecture. Specifically, a network of machine-learning layers can be provided in the specialized AI architecture to normalize or balance the outputs of the classifier model, while continuously comparing the user to other users.

Additionally, certain aspects of the present disclosure are provided to optimize the hyperparameters of machine-learning models included in the specialized AI architecture. In some implementations, the specialized AI architecture can be configured to detect the optimal hyperparameters for a given machine-learning model using reinforcement learning techniques, such as block coordinate descent. Optimizing hyperparameters achieves a technical improvement to the functioning of the server executing the specialized AI architecture by reducing training time, reducing overfitting, and reducing the memory needed to train and execute the specialized AI architecture.

As an illustrative example, the specialized AI architecture can perform feature extraction from the feature groups using an unsupervised feature extraction model. If, however, the unsupervised feature extraction model is configured with 500 neurons, then the unsupervised feature extraction model can create a bottleneck, which reduces performance. The bottleneck is that the training time for the unsupervised feature extraction model can be five hours. Certain aspects of the present disclosure relate to executing hyperparameter optimization techniques to identify the optimal hyperparameters (e.g., the optimal number of layers) for the unsupervised feature extraction model. The specialized AI architecture can execute the hyperparameter optimization techniques to determine that the optimal number of neurons for the unsupervised feature extraction model is five. The reduction in the number of neurons from 500 to five, based on a result of performing the hyperparameter optimization technique, can reduce the time needed to train the unsupervised feature extraction model from five hours to 1 hour. The improvement in the time needed to train achieves a technical improvement to the functioning of the servers that execute the specialized AI architecture.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a block diagram illustrating an example of a network architecture 100 of a behavior prediction system 110, according to certain aspects of the present disclosure. Network architecture 100 can be configured to facilitate digital communications between a user device 105, the behavior prediction system 110, and external data sources (e.g., any one or more of external data source 125 through external data source 140).

The user device 105 can be any portable (e.g., smartphone, tablet computing device, laptop, etc.) or non-portable (e.g., electronic kiosk, desktop computer, etc.) computing device operated by a user or by another individual on behalf of the user. While the network architecture 100, as illustrated in FIG. 1, includes a single user device 105, the network architecture 100 can include any number of user devices. The user device 105 can communicate with the behavior prediction system 110 by executing a native application 145 or by accessing a web server (not shown) that hosts a website operated by the behavior prediction system 110.

The behavior prediction system 110 can include a network of one or more servers and databases. The network within the behavior prediction system 110 can include a web server that hosts one or more webpages or an application server that hosts the native application 145. For example, the user device 105 can interact with the behavior prediction system 110 by transmitting a communication to the application server of the behavior prediction system 110 using the native application 145 executing on the user device 105.

The network 115 can be any type of network that facilitates digital communications between computing devices, using any of a variety of commercially-available protocols, including without limitation TCP/IP (transmission control protocol/Internet protocol), SNA (systems network architecture), IPX (Internet packet exchange), AppleTalk, and the like. In some implementations, the network 115 can be a cloud-based network. In other implementations, the network 115 can be an on-premises network associated with an enterprise. The network 115 can be a local area network (LAN), such as one based on Ethernet, Token-Ring and/or the like. Alternatively, the network 115 can be a wide-area network and the Internet, such as a virtual network, a virtual private network (VPN), an intranet, an extranet, a public switched telephone network (PSTN), an infra-red network, a wireless network, or any other suitable network or combination thereof.

Each external data source 125 through 140 can include one or more databases that store structured or unstructured user data that characterizes any aspect of the specific user operating the user device 105. Each external data source 125 through 140 can be any of a private database or a public database. For example, the external data source 125 can be a private database operated by a bank that stores an electronic document, such as a bank statement that characterizes transactions made by the user. As another example, the external data source 130 can be a publicly accessible database that stores a set of statistics or descriptions of various occupations (e.g., the public database provided by the Bureau of Labor Statistics). The external data sources 125 through 140 can be operated by any third-party entity, such as a private enterprise or a government entity.

Any combination of the computing devices illustrated in the network architecture 100 can communicate with each other. As an illustrative example, the user device 105 can be operated by a user to transmit a request 150 for initiating an obligation for a car 160. In response to receiving the request 150, the behavior prediction system 110 can process the request 150 using a specialized AI architecture 120 to generate a response 155 to the request 150. The response 155 can represent an approval or denial of the request 150 to initiate the obligation. If the response 155 is an approval, the behavior prediction system 110 can facilitate the disbursement of funds to the user. To process the request 150, the behavior prediction system 110 can access any one or more of the external data sources 125 through 140 to retrieve any structured or unstructured user data associated with the user. The structured or unstructured user data can characterize any aspect of the user. The behavior prediction system 110 can input the retrieved structured or unstructured user data into the specialized AI architecture 120 to generate a user parameter. The user parameter can represent a predicted probability of a future behavior of the user with respect to the specific obligation requested in request 150 (or any obligation generally). The predicted probability of the future behavior of the user can be represented by any value (e.g., a score) that is an indication of a degree to which the user is predicted to satisfy the specific or to not satisfy the obligation (or any obligation generally). Additionally, the specialized AI architecture 120 can detect one or more other users who are predicted to be similar to the user requesting the obligation in the request 150. The components of the behavior prediction system 110 are described with respect to FIG. 2. The present disclosure is not limited to the obligation being a loan. Any type of obligation can be requested (e.g., legal obligation, student loan, mortgage, etc.).

Figure 2:
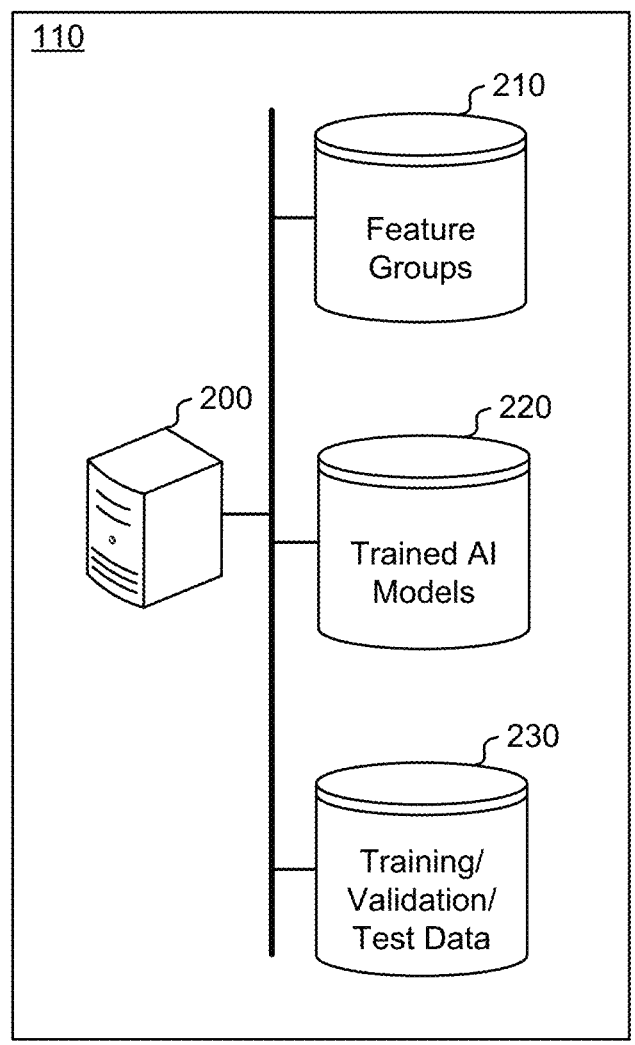
FIG. 2 is a block diagram illustrating another example of the behavior prediction system, according to certain aspects of the present disclosure.

FIG. 2 is a block diagram illustrating an example of the behavior prediction system 110, according to certain aspects of the present disclosure. In some implementations, the behavior prediction system 110 includes a server 200, a database 210 storing feature groups, a database 220 storing trained AI models, and a database 230 storing training data, validation data, or test data for any of the trained AI models stored in database 220. The server 200 can store source code that, when executed, implements the specialized AI architecture 120 illustrated in FIG. 1.

The database 210 can store feature groups associated with some or all of the users who have previously transmitted a request to initiate an obligation to the behavior prediction system 110. A feature group can represent a grouping of one or more features extracted from unstructured user data that characterizes an aspect of a user. Non-limiting examples of feature groups include features relating to the user's occupation, the user's occupation, the user's transactional history, and features relating to any other aspect of the user.

The database 220 can store the source code that is executed to train the various AI models included in the specialized AI architecture 120. For example, the source code can also include the model artifact that is created in response to the training process, including, for example, hyperparameters (e.g., a number of layers), learnt parameters (e.g., feature weights or activation function outputs, etc.), or any other aspect that defines a machine-learning model.

In some implementations, the database 220 stores the source code that represents the various layers of the specialized AI architecture 120. As an illustrative example, the database 220 can store a natural-language-processing (NLP) layer, which followed by a first layer, second layer, third layer, fourth layer, fifth layer, sixth layer, seventh layer, and eighth layer of the specialized AI architecture 120. The first layer can be a normalization layer that performs a Min-Max normalization on the various features of each feature group. The second layer can be a feature importance normalization layer that generates a scalar value for each feature group. The scalar value for each feature group can be individually generated using a reinforcement learning technique (e.g., block coordinate descent). Further, the second layer multiplies each feature vector included in the feature group by the scalar value that corresponds to the feature group. Multiplying the scalar value to the vector representation of the feature group results in the importance of the feature group being maintained after the normalization. The third layer can be an unsupervised feature extraction layer that performs a dimensionality reduction on the features included in each feature group of the various feature groups stored in the database 210. The third layer can be an autoencoder or a model that extracts features from each feature group using Principal Component Analysis (PCA). The fourth layer can be a concatenation layer, which concatenates the extracted features from each feature group. In implementations, the fourth layer also includes another unsupervised feature extraction model. The additional feature extraction can reduce redundant data signals, which results in reduced dimensionality, reduced training time, reduced overfitting, and increased accuracy. The output of the fourth layer can be a vector representation of the various features associated with a particular user. The fifth layer can a deep neural network (e.g., one with a single layer of neurons) or support vector machine (SVM) that classifies or predicts the future behavior of the user with respect to an obligation. The vector representation of the user, which is outputted by the fourth layer, can be inputted into the classifier model of the fifth layer to generate the prediction relating to the user. The sixth layer can be a Gaussian density estimator or any other kernel density estimator that estimates a distribution of the various user parameters (e.g., values outputted by the fifth layer for a set of users, such as some or all users who have previously interacted with the behavior prediction system 110). The seventh layer can include a K-fold cross validation of the initial layer through the sixth layer. The outputs of the K-fold cross validation, however, can be ensembled to reduce the variance of outputs of the classifier model of the fifth layer. Lastly, the eighth model can be a nearest neighbor model trained on the outputs of the fourth layer. The user input vector for the user can be inputted into the trained nearest-neighbor model to identify one or more similar users (e.g., nearest neighbors) to the user who have satisfied an obligation or who have not satisfied an obligation.

The database 230 can store the training data, the validation data, and the test data for the various machine-learning models included in the specialized AI architecture 120. The training data can include the unstructured user data associated with users who have previously requested the behavior prediction system 110 to initiate the obligation. The validation data can be used to validate the trained models. The test data can be used as an evaluation of the final trained model. The database 230 can also store any structured or unstructured user data retrieved from any external data source.

Figure 3:
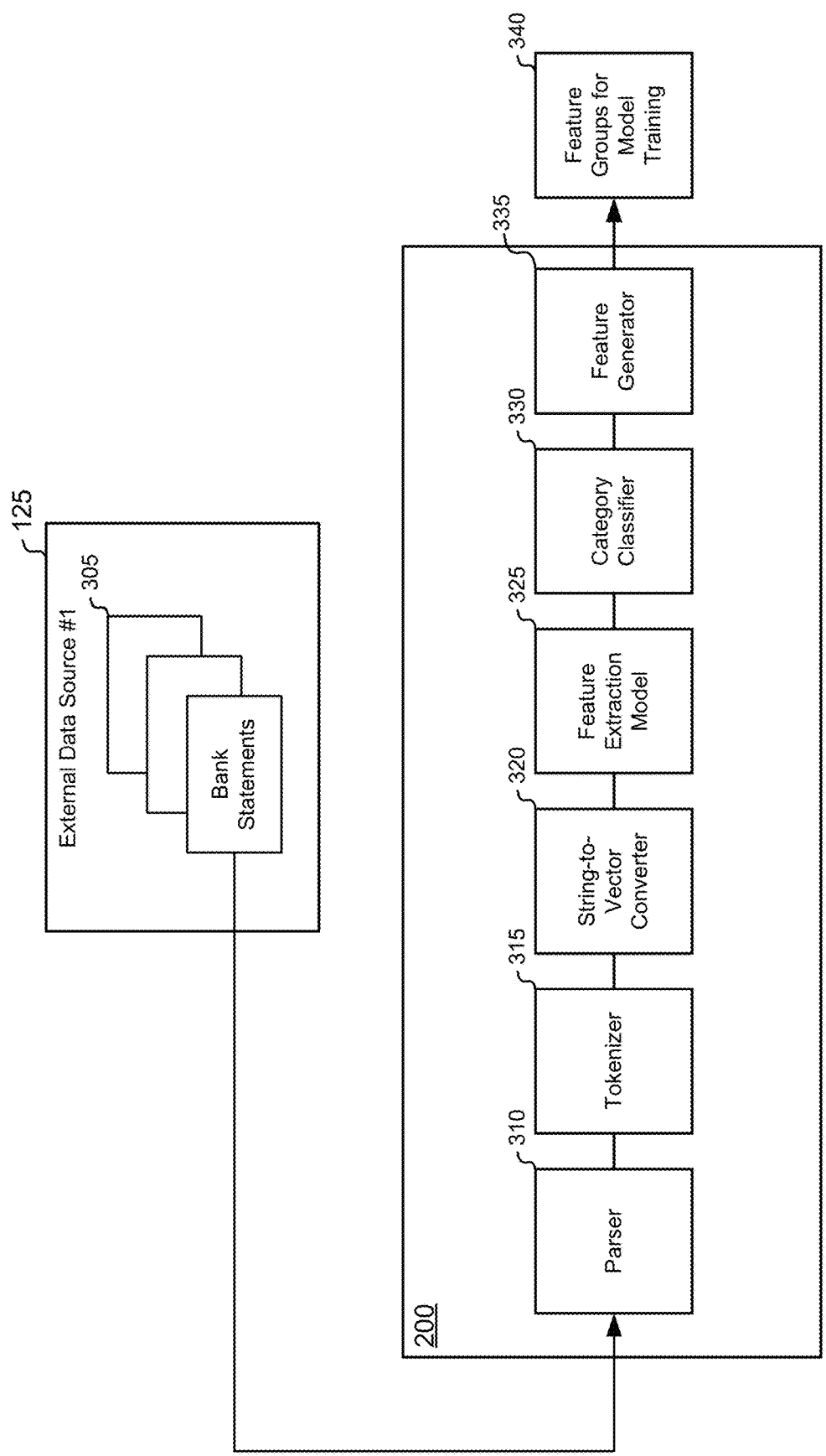
FIG. 3 is a block diagram illustrating another example of the behavior prediction system, according to certain aspects of the present disclosure.

FIG. 3 is a block diagram illustrating another example of a network architecture 300 including the server 200, according to certain aspects of the present disclosure. The server 200 can be configured to extract a set of user features (e.g., vector representations that numerically represent a specific user's characteristics) from unstructured user data associated with a user. The server 200 inputs the set of user features into the specialized AI architecture 120 to generate a prediction of the user's behavior with respect to an obligation (one that has been created or yet to be created). The specialized AI architecture 120) also evaluates a concatenated vector of the set of user features to detect one or more other users that are determined by the specialized AI architecture 120 as being similar to the user (e.g., nearest neighbors to the user).

The unstructured user data 305 can be any data that is not structured in a pre-defined manner, such as documents, emails, posts, video, audio, and images. As an illustrative example, unstructured user data 305 can be one or more bank statements (e.g., a Portable Document Format (PDF)) issued by a bank to a user. The unstructured user data 305 can include descriptions of one or more transactions that the user performed over a previous time period (e.g., 30) days). Each transaction indicated in the unstructured user data can include a text description and a value of the transaction (e.g., an amount paid by the user). While FIG. 3 illustrates an example using the unstructured user data 305, the behavior prediction system 110 can also extract a set of features from structured user data, such as tabular data characterizing the user.

In some implementations, the server 200 can include several components, including a parser 310, a tokenizer 315, a string-to-vector converter 320, a feature extraction model 325, a category classifier 330, and a feature generator 335. Each component of the server 200 can be implemented by executing code by one or more processors. The parser 310 can execute one or more parsing templates that extract text data from the unstructured user data into text characters. For example, a parsing template can be executable code that, when executed, extracts alphanumeric data from specific locations within the unstructured user data. The parsing template can be specific to an entity (e.g., bank) that generated the unstructured user data. The tokenizer 315 receives the text data extracted by the parser 310 and separates the text data into individual words.

The individual words outputted by the tokenizer 315 are inputted into the string-to-vector converter 320. For example, the string-to-vector converter 320 can be a word-to-vector model (e.g., Word2Vec, Bag of Words, Skip-gram model, Continuous Bag of Words (CBOW) model, and other suitable word-to-vector models). The string-to-vector converter 320 can include a fixed dictionary of size N. During training, the string-to-vector converter 320 identifies the N most frequently used words from some or all previous transactions and takes the N most frequently-used words to build the dictionary. For every transaction included in the unstructured user data 305, the string-to-vector converter 320 can filter the words in the corresponding text string, which are outputted by the tokenizer 315, using the dictionary. The string-to-vector converter 320 can then increment a vector by an integer (e.g., one) for each vector element associated with a word included in the filtered text string. The string-to-vector converter 320 outputs a word vector representation of the words included in the text string outputted by the tokenizer 315. In some implementations, the dictionary size N is optimized using hyperparameter optimization techniques jointly with the classification accuracy.

The feature extraction model 325 can be an unsupervised model trained to reduce the dimensionality of the words vectors, normalize the words vectors, and project the words vectors into a domain space. The words vectors represent the text string for each transaction included in the unstructured user data 305. For example, the feature extraction model 325 can be a PCA model with the PCA coefficients providing a fixed-variance hyperparameter. The basis functions can be used to transform the words vectors into floating point representations. The variance of the words vectors can also be optimized using hyperparameter optimization techniques jointly with the classification accuracy. The category classifier 330 can be, for example, a deep neural network, a random forest classifier, or a support vector classifier, trained to classify each individual word vector outputted by the feature extraction model 325. In some implementations, each word vector is classified into one or more categories of transaction. Non-limiting examples of categories of transactions include fixed transactions (e.g., transactions defined by a fixed value), recurring transactions (e.g., transactions that occur over a regular or irregular interval), non-recurring transactions (e.g., annual transactions that do not occur on at a pre-defined time), and any other suitable category of transaction.

The feature generator 335 can execute one or more feature extraction techniques to extract features from the categorized transactions. The feature generator 335 can bin the extracted features into a histogram and detect one or more spending patterns across the various categories. For example, the feature generator 335 performs a dimensionality reduction on the categorized transactions to reduce the number of transactions identified in the unstructured user data 305 (e.g., to a small set of vectors ordered by categories that are based on transactional spending patterns), which reduces training time due to the reduced feature set. The server 200 can generate the feature groups 340 as an output of the feature generator 335. Non-limiting examples of feature groups include features relating to education (e.g., quality, level, and expected salary), occupation, length of overall transactional history, and other suitable features.

Figure 4:
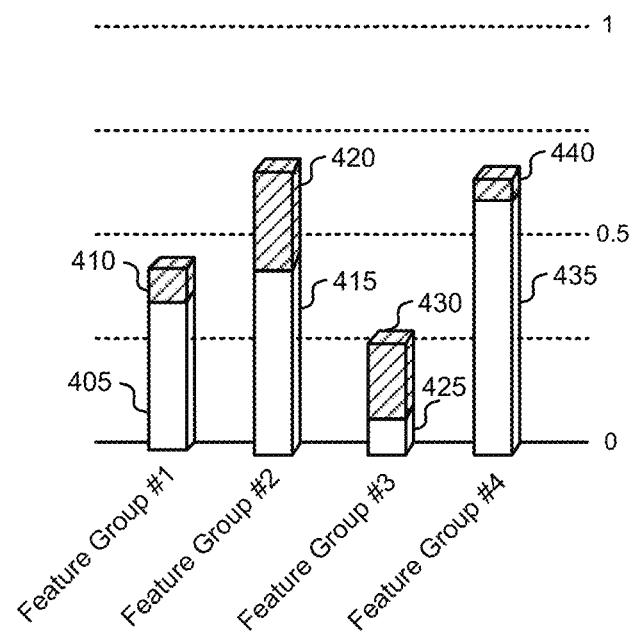
FIG. 4 is a diagram illustrating an example of normalization parameters generated for various feature groups, according to certain aspects of the present disclosure.

FIG. 4 is a diagram illustrating an example of normalization parameters generated for feature groups, according to certain aspects of the present disclosure. As an illustrative example, a histogram 400 shows four feature groups; namely, feature group #1, feature group #2, feature group #3, and feature group #4. Each of feature groups #1 through #4 represents one or more features extracted from the categorized transactions outputted by the category classifier 330 described with respect to FIG. 3. Feature group #1 can represent five different features associated with a user's occupation (e.g., expected salary, the number of employees employed by the employer), feature group #2 can represent eight different features associated with the user's formal education (e.g., education level, quality of academic institution), feature group #3 can represent 100 different features associated with the user's previous transactions (e.g., the difference between the last 90 days of transactions versus the last 180 days of transactions), and feature group #4 represents 30 different features associated with a user profile created by the user.

The histogram 400 shows a bar for each of feature groups #1 through #4. The magnitude of each bar 405, 415, 425, and 435 can represent a relative importance value assigned to the feature group. The relative importance value for a feature group can indicate a programmatically-determined usefulness of the feature group (over other feature groups) in predicting a user behavior with respect to an obligation. The relative importance value for each feature group can be programmatically determined using any technique for determining feature importance, such as statistical correlation, coefficients calculated as part of linear models, decision trees, and permutation importance.

The feature groups #1 through #4 represent different features extracted from various portions of the unstructured user data 305 (as shown in FIG. 3). For example, some features are extracted directly from electronic documents included in the unstructured user data 305, whereas, other features are extracted from public databases (e.g., an expected salary for an occupation is retrieved from a Department of Labor database). Accordingly, one feature can represent a value associated with one scale, whereas, another feature can represent another value associated with another scale. Given the different scales of the extracted features, the specialized AI architecture 120 normalizes and reduces the features in each of feature groups #1 through #4. Normalizing and reducing the features in each of feature groups #1 through #4 achieves several technical improvements to the functioning of the server 200, including, for example, reducing a training time needed to train the various models of the specialized AI architecture 120, reducing overfitting on the training data, improving the clustering performed by the nearest neighbor layer of the specialized AI architecture 120, and other computer-based improvements.

A technical challenge arises, however, when the features included in each feature group are normalized and reduced (e.g., when the first layer, as described with respect to FIG. 2, performs a normalization technique, such as Min-Max normalization). For example, during normalization of the features, the relative importance value of a feature group can be diminished or lost. Diminishing or losing the relative importance value of a feature group can cause a reduction in accuracy of the prediction of user behavior with respect to an obligation, as predicted by the specialized AI architecture 120.

To further improve the functioning of the server 200 and provide a technical solution to this technical challenge, the specialized AI architecture 120 generates a normalization parameter for each feature group, which causes the relative importance value to be maintained during the normalization process. As an illustrative example, the specialized AI architecture 120 generates a normalization parameter 410 for the feature group #1, a normalization parameter 420 for the feature group #2, a normalization parameter 430 for the feature group #3, and a normalization parameter 440 for the feature group #4. In some implementations, the normalization parameters 410 through 440 are each scalar values that are multiplied to each feature in their corresponding feature group. For example, each feature included in the feature group #1 can be multiplied by the normalization parameter 410. Further, in some implementations, the specialized AI architecture 120 can individually generate the normalization parameters 410 through 440 using a reinforcement learning technique, such as block coordinate descent. For example, the specialized AI architecture 120 executes a block coordinate descent technique to discover the normalization parameters 410 through 440. In some implementations, the features of each feature group can be normalized using different techniques, reducing or increasing its impact on the overall training process based on its performance on a given metric.

Figure 5:
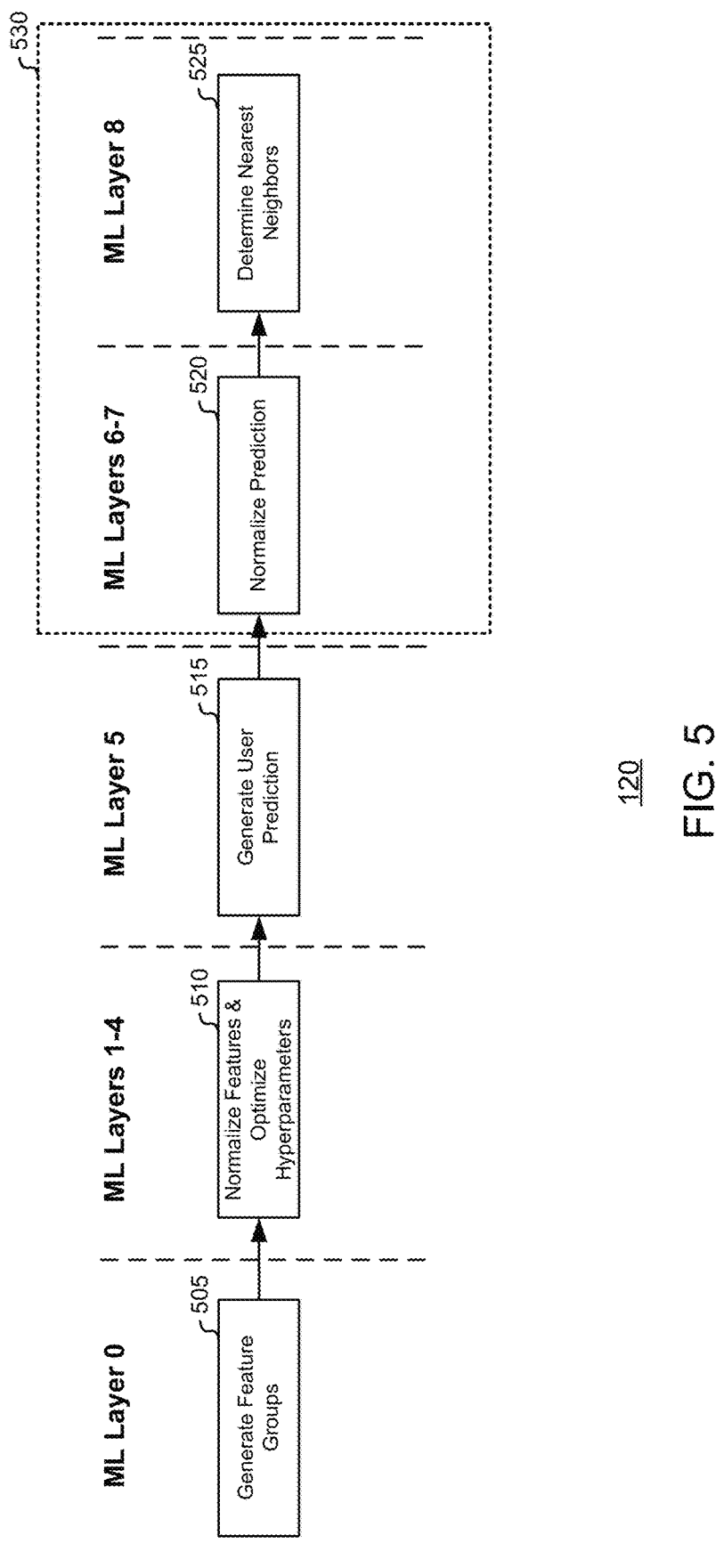
FIG. 5 is a diagram illustrating an example of the various layers of a specialized AI architecture, according to certain aspects of the present disclosure.

FIG. 5 is a diagram illustrating an example of the various layers of the specialized AI architecture 120, according to certain aspects of the present disclosure. In some implementations, the specialized AI architecture 120 can include machine-learning (ML) layers 0 through 8.

ML layer 0 can include one or more machine-learning models that are trained to generate a set of feature groups (as indicated by operation 505). For example, ML layer 0 can extract a text string from the unstructured user data 305 (as shown in FIG. 3) using a parsing template. The text string can include a text description of one or more transactions performed by the user. ML layer 0 can also include a natural-language-processing (NLP) model that is trained to classify the individual words of each transaction description into one or more of a set of categories. Additionally, ML layer 0 executes feature extraction techniques from the categorized words to generate features that can be used to train ML layers 1 through 8. FIG. 3 illustrates an example of the various components and operations performed by ML layer 0.

ML layers 1 through 4 can be configured to pre-process the feature groups generated by ML layer 0. Pre-processing the feature groups can include rescaling, normalizing, and reducing a dimensionality of the various features included in each feature group (as in operation 510). Further, pre-processing the feature groups can also include performing hyperparameter optimization to optimize the hyperparameters for a given model included in the specialized AI architecture 120. The output of ML layer 4 can include a user input vector that represents a concatenation of the extracted, rescaled, normalized, and reduced features that correspond to the user. For example, the output of ML layer 4 can be a rescaled, normalized, and reduced vector representation of the various features that characterize aspects of a particular user.

Additionally, ML layers 1 through 4 improve the functioning of the server 200 by reducing the dimensionality of certain feature groups, reducing the number of total learnt parameters of the models, and reducing overfitting and overall noise, while increasing the robustness of the specialized AI architecture 120. These technical improvements result in improved clustering and faster convergence of neural networks, while reducing the time needed to train the various models. ML layers 1-4 are individually described with respect to FIG. 6.

ML layer 5 can include a deep neural network (e.g., one with a single layer of neurons) or support vector machine (SVM) trained to classify the future behavior of the user with respect to an obligation (as in operation 515). As an illustrative example, the user input vector from ML layer 4 is inputted into ML layer 5, and the output of ML layer 5 is a classification that represents a prediction of the future behavior of the user with respect to an obligation.

The output of deep neural networks, however, can experience significant variance each time the same input is passed into the deep neural network. The variance of classifications predicted by the deep neural networks reduces the performance of the server 200 because the variance is often due to technical aspects of the black-box nature of the deep neural networks. Further, a variance in classifications for the same input also reduces the performance of the server 200 because the variance reduces the accuracy of the predictions generated by the deep neural networks.

Certain aspects of the present disclosure are provided to improve the functioning of the server 200 by solving the performance issues of deep neural networks. Specifically, a network 530 is provided in the specialized AI architecture 120 to balance the outputs of the ML layer 5, while continuously comparing the user to other users. The network 530 includes ML layers 6, 7, and 8. For example, ML layers 6 and 7 normalize the outputs relating to the predicted user behavior with respect to an obligation (as in operation 520). ML layer 8 programmatically determines a number of other users who share similar features to the user using a nearest-neighbor model (as in operation 525). FIG. 7 illustrates an example of the various components and operations performed by the ML layers 6, 7, and 8 of the network 530. Finally, the output of the specialized AI architecture 120 can be a set of other users who are programmatically determined to be similar to the user. Similarity is determined using a nearest-neighbor model that evaluates the user input vectors (e.g., the output of ML layer 4) of some or all users who have transmitted a request to the behavior prediction system 110. The pre-processing operations performed by ML layers 1 through 4 are described below with respect to FIG. 6.

Figure 6:
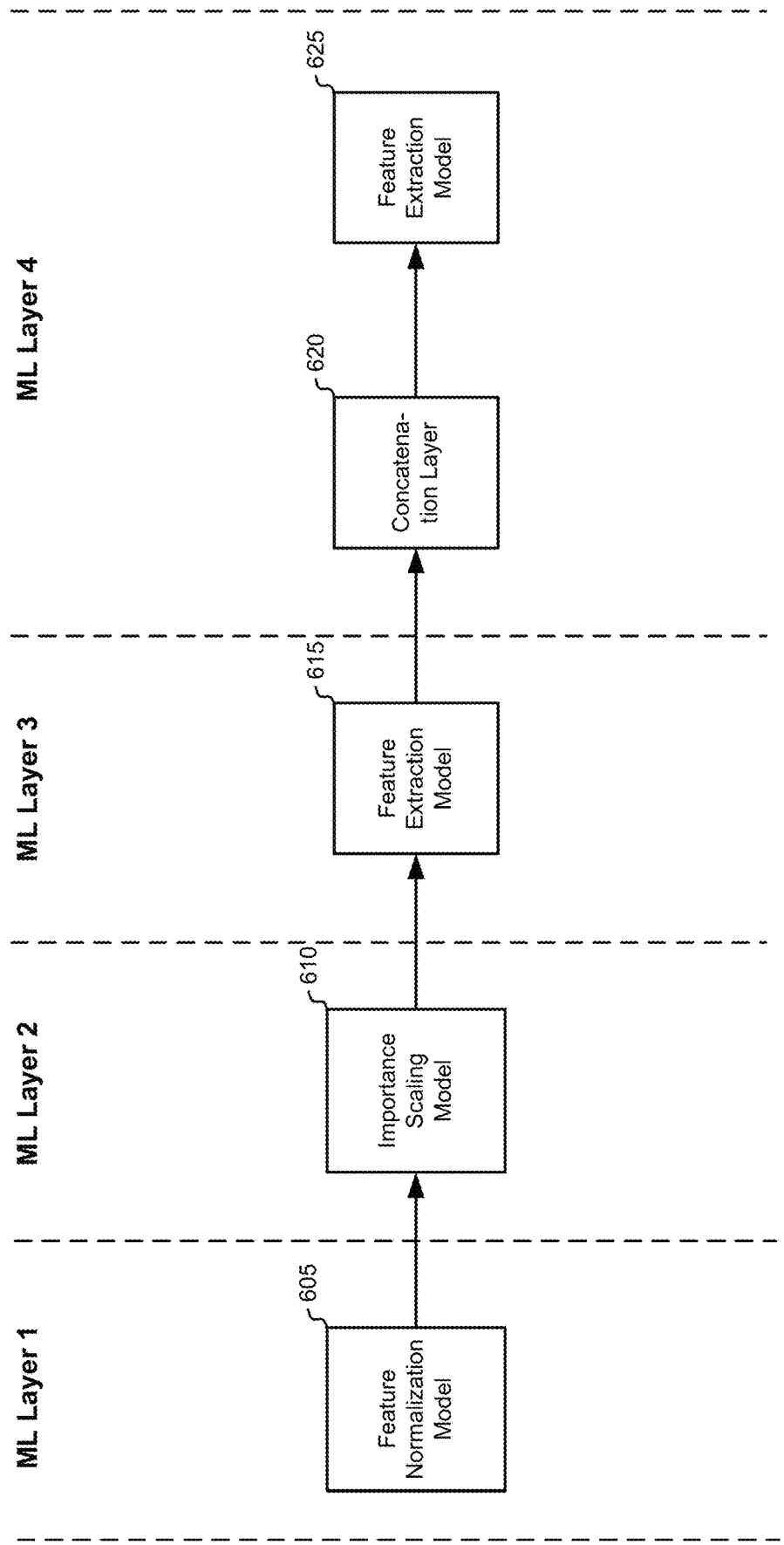
FIG. 6 is a diagram illustrating an example of a pre-processing layer of the specialized AI architecture, according to certain aspects of the present disclosure.
Figure 7:
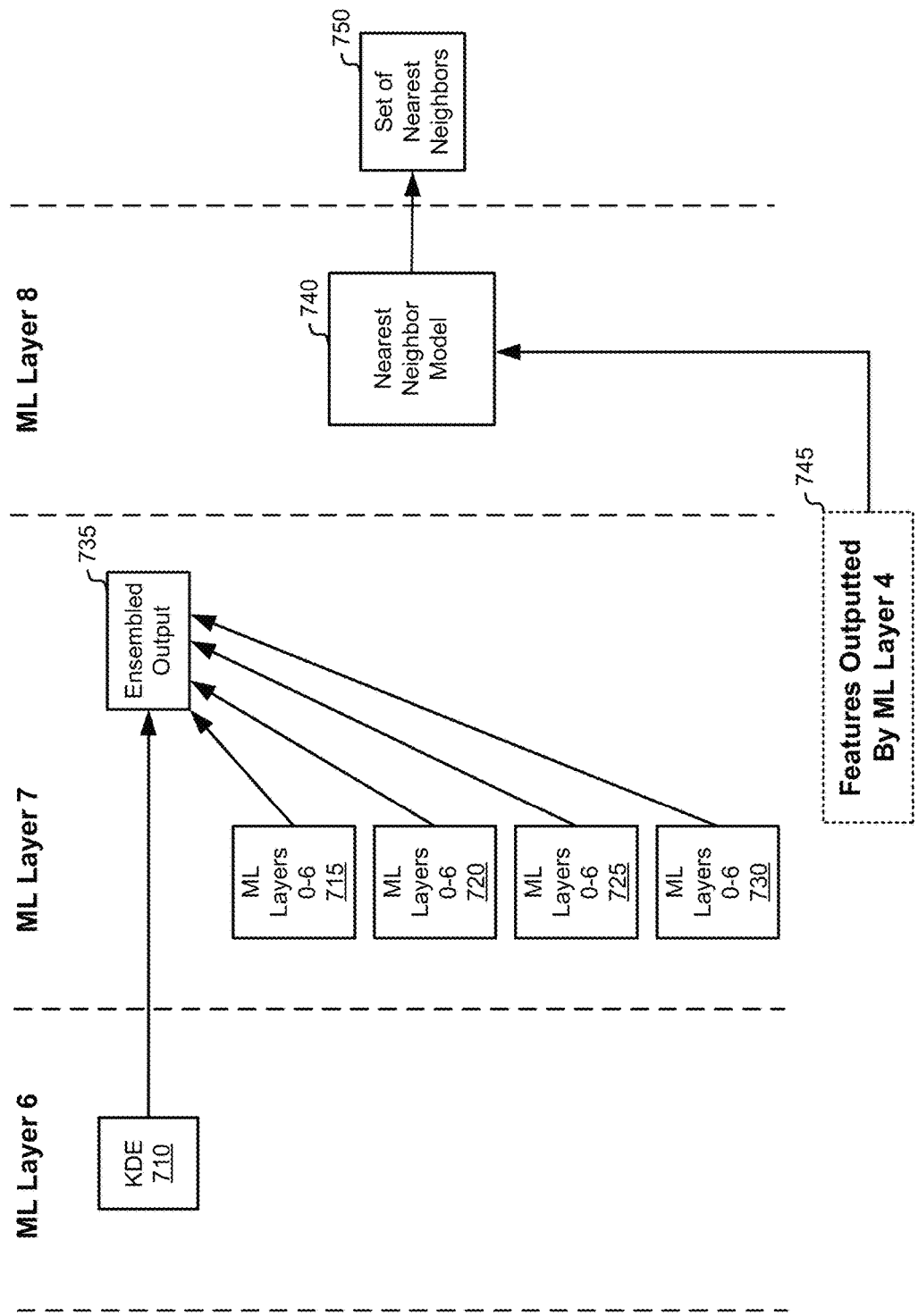
FIG. 7 is a diagram illustrating an example of a network included in the specialized AI architecture, according to certain aspects of the present disclosure.

FIG. 6 is a diagram illustrating an example of ML layers 1 through 4, which are included in specialized AI architecture 120, according to certain aspects of the present disclosure. ML layer 1 receives the feature groups generated by ML layer 0. Further, ML layer 1 includes a feature normalization model 605 that normalizes the features included in each feature group. In some implementations, the feature normalization model 605 can perform a Min-Max normalization on the features included in each feature group to rescale each feature to a range of 0 to 1. The feature normalization model 605 can execute any normalization, rescaling, or standardization technique to normalize the features of a given feature group. Further, the feature normalization model 605 can normalize the features included in one feature group using a given normalization technique and the features included in another feature group using a different normalization technique.

ML layer 2 can include an importance scaling model 610 that normalizes an importance of feature groups using normalization parameters. For example, ML layer 2 executes a reinforcement learning technique (e.g., block coordinate descent) to select an optimal normalization parameter for each feature group. The ML layer 2 multiplies the features included in a feature group by the normalization parameter that the importance scaling model 610 selected for the feature group. FIG. 4 illustrates an example of a normalization parameter, such as normalization parameters 410 through 440.

ML layer 3 can include a feature extraction model 615 that receives the normalized features and performs a feature extraction technique on the normalized features. The feature extraction technique extracts one or more features that are programmatically detected as being useful or important with respect to predicting a user behavior of the user regarding an obligation. Further, the feature extraction technique reduces a dimensionality of the features within a feature group, reduces the parameters learnt by the feature extraction model 615, and reduces overfitting and noise. As an illustrative example, the feature extraction model 615 can execute an autoencoder or a PCA technique to extract a subset of features from the set of features included in a feature group.

ML layer 4 can include a concatenation layer 620 that concatenates the features that remain after rescaling the features and reducing the dimensionality of feature groups into a user input vector. In some implementations, another feature extraction model 625 can optionally be executed to perform another round of feature extraction. An additional round of feature extraction reduces redundancy in the remaining features, which further reduces dimensionality, training time, and overfitting. For example, the additional round of feature extraction can identify that two different features represent the same data signal, and thus, only one of those two features is extracted. The output of ML layer 4 can be a user input vector the represents certain features of an individual user. Further, the output of ML layer 4 is inputted into the classifier model of ML layer. Given that the classification outputted by the ML layer 5 can experience a variance for the same input, certain aspects of the present disclosure relate to the ML layers 6, 7, and, which are provided to normalize the outputted classification of the ML layer 5 to reduce the variance of the outputted classifications. ML layers 6, 7, and 8 are described with respect to FIG. 7 below:

FIG. 7 is a diagram illustrating an example of the network 530 included in the specialized AI architecture 120, according to certain aspects of the present disclosure. The network 530 improves the functioning of the server 200 by reducing the variance of the classifications generated by the specialized AI architecture 120. Reducing the variance of the predictive outputs improves the accuracy of the predictions generated by the specialized AI architecture 120.

The ML layer 6 can include a kernel density estimator 710 (e.g., a Gaussian density estimator), which receives the output of the ML layer 5 (e.g., a probability estimate that is used for classification purposes). In some implementations, the coefficients of the kernel density estimator 710 can be determined using a grid search technique and a block coordinate descent technique. The output of the kernel density estimator 710 can be inputted into a piecewise linear model (not shown) and normalized over a histogram having a predefined number of buckets (e.g., 80 buckets). The histogram ensures that the probability estimates outputted by the ML layer 5 are normalized to be uniformly distributed between a range of values (e.g., between a value of 300 and a value of 850).

The ML layer 7 can perform a K-fold cross validation by constructing K versions of the model architecture including the ML layers 0 through 6. The training data set can be split into K segments. Each version of the model architecture of ML layers 0) through 6 can be trained using a segment of the K segments of the training data set. The ML layer 7 can ensemble the output of each of the K versions of the model architecture (e.g., ML layers 0) through 6) into an ensembled output 735. The ensembled output 735 can be determined by combining (e.g., averaging, weighted averaging, summing, and any other combination) the outputs of the K versions of the model architecture. The ensembled output 735 can be a value (e.g., a score) that represents a prediction of a probability of the user defaulting on an obligation. As an illustrative example, in the ML layer 7, five different versions of the model architecture that includes ML layers 0) through 6 are constructed. The kernel density estimator 710 represents one version of the model architecture (the ML layers 0) through 5 for this version are not shown), and model architectures 715, 720, 725, and 730 represent the remaining four versions of the model architectures. The outputs of all of the five versions of the model architectures are combined (e.g., averaged) into the ensembled output 735. Each version of the five versions of the model architecture is trained using a segment of the training data set.

The ML layer 8 can include a nearest neighbor model 740 that is trained over the concatenated normalized features (e.g., the output of the ML layer 4 at element 745) generated for a set of users (e.g., all users registered with the behavior prediction system 110). The nearest neighbor model 740 can detect a set of nearest neighbors 750 (e.g., similar users) who satisfied an obligation or who did not satisfy an obligation. In some implementations, the nearest neighbor model 740 identifies the Gaussian distribution distance between the user and each other user. The other users who are associated with a Gaussian distribution distance that is within a threshold distance are determined to be similar to the user.

The ML layers 6, 7, and 8 achieve an improvement to the functioning of the server 200 by providing a technical solution to the performance issues of deep neural networks (e.g., a variance of predictions for the same input). For example, the ML layers 6, 7, and 8 are provided in the specialized AI architecture 120 to balance the outputted classifications of the ML layer 5, while continuously comparing the user to other users using the nearest neighbor model 740 of the ML layer 8. As another example, the ML layers 6, 7, and 8 reduce overfitting the specialized AI architecture 120 to the training data, and therefore, improve the performance of the specialized AI architecture 120 in terms of training speed and prediction accuracy.

Figure 8:
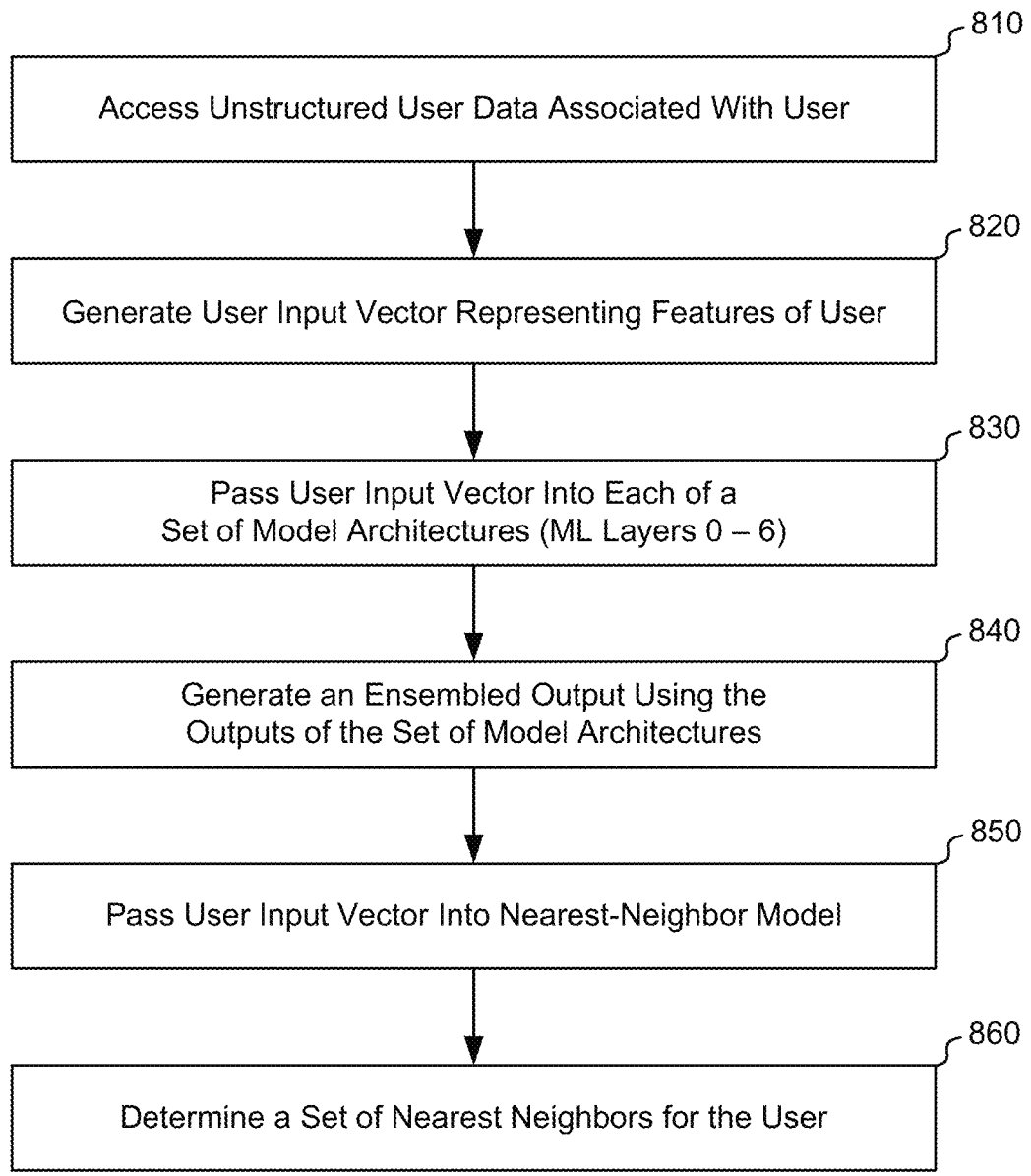
FIG. 8 is a flow diagram illustrating an example of a process for generating a prediction of a user behavior with respect to an obligation, according to certain aspects of the present disclosure.

FIG. 8 is a flow diagram illustrating an example of a process 800 for generating a prediction of a user defaulting on an obligation, according to certain aspects of the present disclosure. The process 800 can be performed by any of the hardware-based components described with respect to FIGS. 1-3. For example, the server 200 can perform the process 800 in response to receiving a request to initiate an obligation from a user device operated by a user. The output of performing the process 800 includes a response (e.g., an approval or denial) to the request to initiate the obligation.

At block 810, the server 200 can access unstructured user data associated with the user. The unstructured user data can be retrieved from one or more external data sources, such as a server operated by a bank that stores a bank statement issued to the user. The unstructured user data can include information that characterizes an aspect of the user (e.g., items recently purchased by the user, an education level of the user, an occupation of the user, etc.).

At block 820, the server 200 can generate a user input vector representing one or more features extracted from the unstructured user data. For example, the server 200 can execute the ML layers 0) through 4 of the specialized AI architecture 120 using the retrieved unstructured user data to generate the user input vector that represents characteristics of the user.

At block 830, the server 200 can pass the user input vector into each of a set of model architectures. For example, a model architecture can include the ML layers 0 through 6, and the server 200 can construct five versions of the model architecture. While the model architecture of each version can be the same, each version of the model architecture is trained using a different fold (e.g., subset) of the training data.

At block 840, the server 200 can ensemble the outputs of the set of model architectures into a single value, which can represent the prediction associated with the user. Ensembling the outputs of the five model architectures can include, for example, computing an average of the outputs of the model architectures (e.g., the ML layers 0 through 6), computing a weighted average of the outputs, or computing a sum of the outputs. The server 200 can also determine the variance across the outputs of the set of model architectures.

At block 850, the server 200 passes the user input vector for the user to a nearest neighbor model. The nearest neighbor model can be trained using the user input vectors of a set of other users (e.g., users who have registered with the behavior prediction system 110 and created a profile). For example, the nearest neighbor model can be trained using the concatenated feature vector that is outputted by the ML layer 4 for each of the set of other users.

At block 860, in response to passing the user input vector into the nearest neighbor model at block 850, the nearest neighbor model can identify a set of nearest neighbors (e.g., other similar users) who have user input vectors that are within a distance (e.g., Gaussian distribution distance) of the user input vector of the user. For example, the server 20 can determine that other users associated with user input vectors that are within a threshold Gaussian distribution distance of the user input vector of the user are similar to each other. In some implementations, the behavior prediction system 110 can present an interface (e.g., a dashboard) that displays a set of nearest neighbors who have defaulted on an obligation or a set of nearest neighbors that who have satisfied an obligation.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

As used below, any reference to a series of examples is to be understood as a reference to each of those examples disjunctively (e.g., "Examples 1-4" is to be understood as "Examples 1, 2, 3, or 4").

Example 1 is a system, comprising: one or more processors; and a non-transitory computer-readable medium communicatively coupled to the one or more processors and storing program code executable by the one or more processors implementing a behavior prediction system configured to predict a behavior of a user with respect to an obligation, the behavior prediction system comprising: a natural language processing (NLP) layer configured to extract one or more feature groups associated with the user from unstructured user data associated with the user; a concatenation layer configured to generate a user input vector using the unstructured user data, the user input vector representing the one or more feature groups associated with the user; a set of trained machine-learning models configured to receive the user input vector and generate an ensembled output predicting the behavior of the user with respect to the obligation, each trained machine-learning model of the set of trained machine-learning models including a density estimator configured to generate a probability vector corresponding to the user, and the set of trained machine-learning models being configured to generate the ensembled output based on a combination of the probability vector outputted by each density estimator; and a nearest-neighbor layer configured to receive the user input vector and determine a set of nearest neighbors to the user, each nearest neighbor of the set of nearest neighbors corresponding to another user who has satisfied or defaulted on another obligation, wherein an identifier for each of the set of nearest neighbors is presented on an interface.

Example 2 is the system of example 1, wherein the NLP layer is further configured to: parse the unstructured user data using one or more parsing templates; extract transaction data based on a result of parsing the unstructured user data, wherein the transaction data includes a plurality of text strings, and each text string of the plurality of text strings represents a transaction associated with the user; generate a plurality of integer vectors, each integer vector of the plurality of integer vectors being generated by inputting a text string of the plurality of text strings into a trained word-to-vector model, and each integer vector of the plurality of integer vectors having a dimensionality; reduce, for each integer vector of the plurality of integer vectors, the dimensionality using an unsupervised feature extraction model; input each reduced-dimensionality integer vector into a classifier model; and generate, based on an output of the classifier model, a classification of the transaction associated with the reduced-dimensionality integer vector; categorize each classification generated by the classifier model into a feature group of the one or more feature groups, each feature group of the one or more feature groups being represented by a feature group; generate a histogram representing the one or more feature groups; and detect a pattern of one feature group relative to another feature group of two or more feature groups.

Example 3 is the system of examples 1-2, wherein the behavior prediction system is configured to further comprise: a normalization layer configured to normalize the one or more feature groups by: normalize each feature group of the one or more feature groups; generating a normalization parameter for each feature group of the one or more feature groups, the normalization parameter for each feature group being generated using a reinforcement-learning model; and generating a scaled feature group for each feature group of the one or more feature groups by multiplying the feature group associated with the feature group by the normalization parameter generated for the feature group, wherein a first normalization parameter for a first feature group is different from a second normalization parameter for a second feature group.

Example 4 is the system of examples 1-3, wherein the NLP layer is further configured to: access a bank statement including one or more transactions performed by the user, each transaction of the one or more transactions including a text string of the plurality of text strings, wherein each text string of the plurality of text strings represents the transaction and an amount associated with the transaction; parse the bank statement using the one or more parsing templates; and extract the transaction data from one or more regions of the bank statement based on a result of the parsing.

Example 5 is the system of examples 1-4, wherein the behavior prediction system is configured to further comprise a feature extraction layer, wherein the feature extraction layer is configured to: train an unsupervised feature extraction model associated with one or more hyperparameters, wherein the training occurs over a first training time period; tune the one or more hyperparameters associated with the unsupervised feature extraction model by executing a block coordinate descent technique; train the unsupervised feature extraction model associated with the one or more tuned hyperparameters, wherein the training occurs over a second training time period, wherein tuning the one or more hyperparameters of the unsupervised feature extraction model reduces the second training time period to be smaller than the first training time period; and reduce a dimensionality of the user input vector by inputting the user input vector into the trained unsupervised feature extraction model associated with the one or more tuned hyperparameters.

Example 6 is the system of examples 1-5, wherein the density estimator is further configured to: generate one or more coefficient parameters of the density estimator using a grid search technique and a coordinate block descent technique; generate, using the density estimator, the probability vector corresponding to the user; input the probability vector into a piecewise linear model; and assign an output of the piecewise linear model to a bin of a set of bins that define a histogram, each bin of the set of bins being associated with a range of values.

Example 7 is the system of examples 1-6, wherein the behavior prediction system is further configured to: extract an attribute characterizing the user from the unstructured user data, wherein the unstructured user data is an electronic document; retrieve additional attribute data associated with the attribute from an external database; and extract a feature from the additional attribute data, the feature being included in the user input vector.

Example 8 is a computer-implemented method, comprising: accessing unstructured user data associated with a user; extracting one or more feature groups associated with the user from the unstructured user data associated with the user; generating a user input vector using the unstructured user data, the user input vector representing the one or more feature groups associated with the user; inputting the user input vector into each of a set of trained machine-learning models, each trained machine-learning model of the set of trained machine-learning models including a density estimator configured to generate a probability vector corresponding to the user; generating an ensembled output based on a combination of the probability vector outputted by each density estimator, the ensembled output characterizing a prediction of the user defaulting on an obligation; inputting the user input vector associated with the user into a trained nearest-neighbor model; determining, based on an output of the trained nearest-neighbor model, a set of nearest neighbors to the user, each nearest neighbor of the set of nearest neighbors corresponding to an existing user for which existing unstructured user data is included in the set of training data; and displaying an identifier for each of the set of nearest neighbors on an interface.

Example 9 is the computer-implemented method of example 8, wherein generating the user input vector further comprises: parsing the unstructured user data using one or more parsing templates; extracting transaction data based on a result of parsing the unstructured user data, wherein the transaction data includes a plurality of text strings, and each text string of the plurality of text strings represents a transaction associated with the user; generating a plurality of integer vectors, each integer vector of the plurality of integer vectors being generated by inputting a text string of the plurality of text strings into a trained word-to-vector model, and each integer vector of the plurality of integer vectors having a dimensionality; reducing, for each integer vector of the plurality of integer vectors, the dimensionality using an unsupervised feature extraction model; inputting each reduced-dimensionality integer vector into a classifier model; and generating, based on an output of the classifier model, a classification of the transaction associated with the reduced-dimensionality integer vector; categorizing each classification generated by the classifier model into a feature group of the one or more feature groups, each feature group of the one or more feature groups being represented by a feature group; generating a histogram representing the one or more feature groups; and detecting a pattern of one feature group relative to another feature group of two or more feature groups.

Example 10 is the computer-implemented method of examples 8-9, further comprising: normalizing the one or more feature groups by: generating a normalization parameter for each feature group of the one or more feature groups, the normalization parameter for each feature group being generated using a reinforcement-learning model; and generating a scaled feature group for each feature group of the one or more feature groups by multiplying the feature group associated with the feature group by the normalization parameter generated for the feature group, wherein a first normalization parameter for a first feature group is different from a second normalization parameter for a second feature group.

Example 11 is the computer-implemented method of examples 8-10, wherein accessing the unstructured user data further comprises: accessing a bank statement including one or more transactions performed by the user, each transaction of the one or more transactions including a text string of the plurality of text strings, wherein each text string of the plurality of text strings represents the transaction and an amount associated with the transaction; parsing the bank statement using the one or more parsing templates; and extracting the transaction data from one or more regions of the bank statement based on a result of the parsing.

Example 12 is the computer-implemented method of examples 8-11, wherein generating the user input vector further comprises: training an unsupervised feature extraction model associated with one or more hyperparameters, wherein the training occurs over a first training time period; tuning the one or more hyperparameters associated with the unsupervised feature extraction model by executing a block coordinate descent technique; training the unsupervised feature extraction model associated with the one or more tuned hyperparameters, wherein the training occurs over a second training time period, wherein tuning the one or more hyperparameters of the unsupervised feature extraction model reduces the second training time period to be smaller than the first training time period; and reducing a dimensionality of the user input vector by inputting the user input vector into the trained unsupervised feature extraction model associated with the one or more tuned hyperparameters.

Example 13 is the computer-implemented method of examples 8-12, wherein inputting the user input vector into each of the set of trained machine-learning models further comprises: generating one or more coefficient parameters of the density estimator using a grid search technique and a coordinate block descent technique; generating, using the density estimator, the probability vector corresponding to the user; inputting the probability vector into a piecewise linear model; and assigning an output of the piecewise linear model to a bin of a set of bins that define a histogram, each bin of the set of bins being associated with a range of values.

Example 14 is the computer-implemented method of examples 8-13, further comprising: extracting an attribute characterizing the user from the unstructured user data, wherein the unstructured user data is an electronic document; retrieving additional attribute data associated with the attribute from an external database; and extracting a feature from the additional attribute data, the feature being included in the user input vector.

Example 15 is a computer-program product tangibly embodied in a non-transitory machine-readable storage medium, including instructions configured to cause a processing apparatus to perform operations including: accessing unstructured user data associated with a user; extracting one or more feature groups associated with the user from the unstructured user data associated with the user; generating a user input vector using the unstructured user data, the user input vector representing the one or more feature groups associated with the user; inputting the user input vector into each of a set of trained machine-learning models, each trained machine-learning model of the set of trained machine-learning models including a density estimator configured to generate a probability vector corresponding to the user; generating an ensembled output based on a combination of the probability vector outputted by each density estimator, the ensembled output characterizing a probability that the user will default on an obligation; inputting the user input vector associated with the user into a trained nearest-neighbor model, the trained nearest-neighbor model having been trained using the set of training data; determining, based on an output of the trained nearest-neighbor model, a set of nearest neighbors to the user, each nearest neighbor of the set of nearest neighbors corresponding to an existing user for which existing unstructured user data is included in the set of training data; and displaying an identifier for each of the set of nearest neighbors on an interface.

Example 16 is the computer-program product of example 15, wherein the operation of generating the user input vector further comprises: parsing the unstructured user data using one or more parsing templates; extracting transaction data based on a result of parsing the unstructured user data, wherein the transaction data includes a plurality of text strings, and each text string of the plurality of text strings represents a transaction associated with the user; generating a plurality of integer vectors, each integer vector of the plurality of integer vectors being generated by inputting a text string of the plurality of text strings into a trained word-to-vector model, and each integer vector of the plurality of integer vectors having a dimensionality; reducing, for each integer vector of the plurality of integer vectors, the dimensionality using an unsupervised feature extraction model; inputting each reduced-dimensionality integer vector into a classifier model; and generating, based on an output of the classifier model, a classification of the transaction associated with the reduced-dimensionality integer vector; categorizing each classification generated by the classifier model into a feature group of the one or more feature groups, each feature group of the one or more feature groups being represented by a feature group; generating a histogram representing the one or more feature groups; and detecting a pattern of one feature group relative to another feature group of two or more feature groups.

Example 17 is the computer-program product of examples 15-16, wherein the operations further comprise: normalizing the one or more feature groups by: generating a normalization parameter for each feature group of the one or more feature groups, the normalization parameter for each feature group being generated using a reinforcement-learning model; and generating a scaled feature group for each feature group of the one or more feature groups by multiplying the feature group associated with the feature group by the normalization parameter generated for the feature group, wherein a first normalization parameter for a first feature group is different from a second normalization parameter for a second feature group.

Example 18 is the computer-program product of examples 15-17, wherein the operation of accessing the unstructured user data further comprises: accessing a bank statement including one or more transactions performed by the user, each transaction of the one or more transactions including a text string of the plurality of text strings, wherein each text string of the plurality of text strings represents the transaction and an amount associated with the transaction; parsing the bank statement using the one or more parsing templates; and extracting the transaction data from one or more regions of the bank statement based on a result of the parsing.

Example 19 is the computer-program product of examples 15-18, wherein the operation of generating the user input vector further comprises: training an unsupervised feature extraction model associated with one or more hyperparameters, wherein the training occurs over a first training time period; tuning the one or more hyperparameters associated with the unsupervised feature extraction model by executing a block coordinate descent technique; training the unsupervised feature extraction model associated with the one or more tuned hyperparameters, wherein the training occurs over a second training time period, wherein tuning the one or more hyperparameters of the unsupervised feature extraction model reduces the second training time period to be smaller than the first training time period; and reducing a dimensionality of the user input vector by inputting the user input vector into the trained unsupervised feature extraction model associated with the one or more tuned hyperparameters.

Example 20 is the computer-program product of examples 15-19, wherein the operation of inputting the user input vector into each of the set of trained machine-learning models further comprises: generating one or more coefficient parameters of the density estimator using a grid search technique and a coordinate block descent technique; generating, using the density estimator, the probability vector corresponding to the user; inputting the probability vector into a piecewise linear model; and assigning an output of the piecewise linear model to a bin of a set of bins that define a histogram, each bin of the set of bins being associated with a range of values.

What is claimed is:

1. A system, comprising:
one or more processors; and
a non-transitory computer-readable medium communicatively coupled to the one or more processors and storing program code executable by the one or more processors implementing a behavior prediction system configured to predict a behavior of a user with respect to an obligation, the behavior prediction system comprising:
  a natural language processing (NLP) layer configured to extract feature groups associated with the user from unstructured user data associated with the user;
  a concatenation layer configured to generate a user input vector using the unstructured user data, the user input vector representing the feature groups associated with the user;
  a set of trained machine-learning models comprising deep neural networks, the set of trained machine-learning models being configured to receive the user input vector and generate an ensembled output predicting the behavior of the user with respect to the obligation, each trained machine-learning model of the set of trained machine-learning models including a kernel density estimator, wherein the kernel density estimator of each trained machine-learning model includes coefficient parameters configured using a grid search technique and a coordinate block descent technique, and wherein the kernel density estimator of each trained machine-learning model is configured to:
    generate an initial probability vector corresponding to the user;
    input the initial probability vector into a piecewise linear model to produce an output probability vector; and
    normalize the output probably vector based on a histogram having a predefined number of buckets to produce a normalized probability vector;
  and wherein the set of trained machine-learning models are configured to generate the ensembled output based on a combination of all of the normalized probability vectors outputted by all of the kernel density estimators of all of the trained machine-learning models in the set of trained machine-learning models; and
  a nearest-neighbor layer configured to receive the user input vector and determine a set of nearest neighbors to the user, each nearest neighbor of the set of nearest neighbors corresponding to another user who has satisfied or defaulted on another obligation, wherein an identifier for each of the set of nearest neighbors is presented on an interface.

2. The system of claim 1, wherein the NLP layer is further configured to:
  parse the unstructured user data using one or more parsing templates;
  extract transaction data based on a result of parsing the unstructured user data, wherein the transaction data includes a plurality of text strings, and each text string of the plurality of text strings represents a transaction associated with the user;
  generate a plurality of integer vectors, each integer vector of the plurality of integer vectors being generated by inputting a text string of the plurality of text strings into a trained word-to-vector model, and each integer vector of the plurality of integer vectors having a dimensionality;
  reduce, for each integer vector of the plurality of integer vectors, the dimensionality using an unsupervised feature extraction model;
  input each reduced-dimensionality integer vector into a classifier model; and
  generate, based on an output of the classifier model, a classification of the transaction associated with the reduced-dimensionality integer vector;
  categorize each classification generated by the classifier model into a feature group of the feature groups;
  generate a histogram representing the feature groups; and
  detect a pattern of one feature group relative to another feature group of two or more feature groups.

3. The system of claim 2, wherein the behavior prediction system is configured to further comprise:
  a normalization layer configured to normalize the feature groups by:
    normalizing each feature group of the feature groups;
    generating a normalization parameter for each feature group of the feature groups, the normalization parameter for each feature group being generated using a reinforcement-learning model; and
    generating a scaled feature group for each feature group of the feature groups by multiplying the feature group associated with the feature group by the normalization parameter generated for the feature group, wherein a first normalization parameter for a first feature group is different from a second normalization parameter for a second feature group.

4. The system of claim 2, wherein the NLP layer is further configured to:
  access a bank statement including one or more transactions performed by the user, each transaction of the one or more transactions including a text string of the plurality of text strings, wherein each text string of the plurality of text strings represents the transaction and an amount associated with the transaction;
  parse the bank statement using the one or more parsing templates; and
  extract the transaction data from one or more regions of the bank statement based on a result of the parsing.

5. The system of claim 1, wherein the behavior prediction system is configured to further comprise a feature extraction layer, wherein the feature extraction layer is configured to:
  train an unsupervised feature extraction model associated with one or more hyperparameters, wherein the training occurs over a first training time period;
  tune the one or more hyperparameters associated with the unsupervised feature extraction model by executing a block coordinate descent technique;
  train the unsupervised feature extraction model associated with the one or more tuned hyperparameters, wherein the training occurs over a second training time period, wherein tuning the one or more hyperparameters of the unsupervised feature extraction model reduces the second training time period to be smaller than the first training time period; and
  reduce a dimensionality of the user input vector by inputting the user input vector into the trained unsupervised feature extraction model associated with the one or more tuned hyperparameters.

6. The system of claim 1, wherein the behavior prediction system is further configured to:
  extract an attribute characterizing the user from the unstructured user data, wherein the unstructured user data is an electronic document;
  retrieve additional attribute data associated with the attribute from an external database; and
  extract a feature from the additional attribute data, the feature being included in the user input vector.

7. A computer-implemented method, comprising:
  accessing, by an artificial intelligence (AI) system executing on one or more processors, unstructured user data associated with a user;
  extracting, by a natural language processing (NLP) layer of the AI system, feature groups associated with the user from the unstructured user data associated with the user;
  generating, by a concatenation layer of the AI system, a user input vector using the unstructured user data, the user input vector representing the feature groups associated with the user;
  inputting, by the AI system, the user input vector into each of a set of trained machine-learning models comprising deep neural networks, each trained machine-learning model of the set of trained machine-learning models including a kernel density estimator, wherein the kernel density estimator of each trained machine-learning model includes coefficient parameters configured using a grid search technique and a coordinate block descent technique, and wherein the kernel density estimator of each trained machine-learning model:
    generates an initial probability vector corresponding to the user;
    inputs the initial probability vector into a piecewise linear model to produce an output probability vector; and
    normalizes the output probably vector based on a histogram having a predefined number of buckets to produce a normalized probability vector;
  generating, by the AI system, an ensembled output based on a combination of all of the normalized probability vectors outputted by all of the kernel density estimators of all of the trained machine-learning models in the set of trained machine-learning models, the ensembled output characterizing a prediction of the user defaulting on an obligation;
  inputting, by the AI system, the user input vector associated with the user into a trained nearest-neighbor model;
  determining, by the AI system and based on an output of the trained nearest-neighbor model, a set of nearest neighbors to the user, each nearest neighbor of the set of nearest neighbors corresponding to an existing user for which existing unstructured user data is included in a set of training data; and displaying, by the AI system, an identifier for each of the set of nearest neighbors on an interface.

8. The computer-implemented method of claim 7, wherein generating the user input vector further comprises:

parsing the unstructured user data using one or more parsing templates;

extracting transaction data based on a result of parsing the unstructured user data, wherein the transaction data includes a plurality of text strings, and each text string of the plurality of text strings represents a transaction associated with the user;

generating a plurality of integer vectors, each integer vector of the plurality of integer vectors being generated by inputting a text string of the plurality of text strings into a trained word-to-vector model, and each integer vector of the plurality of integer vectors having a dimensionality;

reducing, for each integer vector of the plurality of integer vectors, the dimensionality using an unsupervised feature extraction model;

inputting each reduced-dimensionality integer vector into a classifier model; and generating, based on an output of the classifier model, a classification of the transaction associated with the reduced-dimensionality integer vector;

categorizing each classification generated by the classifier model into a feature group of the feature groups;

generating a histogram representing the feature groups; and detecting a pattern of one feature group relative to another feature group of two or more feature groups.

9. The computer-implemented method of claim 8, further comprising:

normalizing the feature groups by:

generating a normalization parameter for each feature group of the feature groups, the normalization parameter for each feature group being generated using a reinforcement-learning model; and generating a scaled feature group for each feature group of the feature groups by multiplying the feature group associated with the feature group by the normalization parameter generated for the feature group, wherein a first normalization parameter for a first feature group is different from a second normalization parameter for a second feature group.

10. The computer-implemented method of claim 8, wherein accessing the unstructured user data further comprises:

accessing a bank statement including one or more transactions performed by the user, each transaction of the one or more transactions including a text string of the plurality of text strings, wherein each text string of the plurality of text strings represents the transaction and an amount associated with the transaction;

parsing the bank statement using the one or more parsing templates; and extracting the transaction data from one or more regions of the bank statement based on a result of the parsing.

11. The computer-implemented method of claim 7, wherein generating the user input vector further comprises:

training an unsupervised feature extraction model associated with one or more hyperparameters, wherein the training occurs over a first training time period;

tuning the one or more hyperparameters associated with the unsupervised feature extraction model by executing a block coordinate descent technique;

training the unsupervised feature extraction model associated with the one or more tuned hyperparameters, wherein the training occurs over a second training time period, wherein tuning the one or more hyperparameters of the unsupervised feature extraction model reduces the second training time period to be smaller than the first training time period; and reducing a dimensionality of the user input vector by inputting the user input vector into the trained unsupervised feature extraction model associated with the one or more tuned hyperparameters.

12. The computer-implemented method of claim 7, further comprising:

extracting an attribute characterizing the user from the unstructured user data, wherein the unstructured user data is an electronic document;

retrieving additional attribute data associated with the attribute from an external database; and extracting a feature from the additional attribute data, the feature being included in the user input vector.

13. A computer-program product tangibly embodied in a non-transitory machine-readable storage medium, including instructions configured to cause a processing apparatus to perform operations including:

accessing unstructured user data associated with a user;

extracting, by a natural language processing (NLP) layer of an artificial intelligence (AI) system, feature groups associated with the user from the unstructured user data associated with the user;

generating, by a concatenation layer of the AI system, a user input vector using the unstructured user data, the user input vector representing the feature groups associated with the user;

inputting, by the AI system, the user input vector into each of a set of trained machine-learning models comprising deep neural networks, each trained machine-learning model of the set of trained machine-learning models including a kernel density estimator, wherein the kernel density estimator of each trained machine-learning model includes coefficient parameters configured using a grid search technique and a coordinate block descent technique, and wherein the kernel density estimator of each trained machine-learning model is configured to:

generate an initial probability vector corresponding to the user;

input the initial probability vector into a piecewise linear model to produce an output probability vector; and normalize the output probably vector based on a histogram having a predefined number of buckets to produce a normalized probability vector; and generating, by the AI system, an ensembled output based on a combination of all of the normalized probability vectors outputted by all of the kernel density estimators in all of the trained machine-learning models of the set of trained machine-learning models, the ensembled output characterizing a probability that the user will default on an obligation.

14. The computer-program product of claim 13, wherein the operation of generating the user input vector further comprises:

parsing the unstructured user data using one or more parsing templates;

extracting transaction data based on a result of parsing the unstructured user data, wherein the transaction data includes a plurality of text strings, and each text string of the plurality of text strings represents a transaction associated with the user;

generating a plurality of integer vectors, each integer vector of the plurality of integer vectors being generated by inputting a text string of the plurality of text strings into a trained word-to-vector model, and each integer vector of the plurality of integer vectors having a dimensionality;

reducing, for each integer vector of the plurality of integer vectors, the dimensionality using an unsupervised feature extraction model;

inputting each reduced-dimensionality integer vector into a classifier model; and generating, based on an output of the classifier model, a classification of the transaction associated with the reduced-dimensionality integer vector;

categorizing each classification generated by the classifier model into a feature group of the feature groups;

generating a histogram representing the feature groups; and detecting a pattern of one feature group relative to another feature group of two or more feature groups.

15. The computer-program product of claim 14, wherein the operations further comprise:

normalizing the feature groups by:
    generating a normalization parameter for each feature group of the feature groups, the normalization parameter for each feature group being generated using a reinforcement-learning model; and
    generating a scaled feature group for each feature group of the feature groups by multiplying the feature group associated with the feature group by the normalization parameter generated for the feature group, wherein a first normalization parameter for a first feature group is different from a second normalization parameter for a second feature group.

16. The computer-program product of claim 14, wherein the operation of accessing the unstructured user data further comprises:

accessing a bank statement including one or more transactions performed by the user, each transaction of the one or more transactions including a text string of the plurality of text strings, wherein each text string of the plurality of text strings represents the transaction and an amount associated with the transaction;

parsing the bank statement using the one or more parsing templates; and extracting the transaction data from one or more regions of the bank statement based on a result of the parsing.

17. The computer-program product of claim 13, wherein the operation of generating the user input vector further comprises:

training an unsupervised feature extraction model associated with one or more hyperparameters, wherein the training occurs over a first training time period;

tuning the one or more hyperparameters associated with the unsupervised feature extraction model by executing a block coordinate descent technique;

training the unsupervised feature extraction model associated with the one or more tuned hyperparameters, wherein the training occurs over a second training time period, wherein tuning the one or more hyperparameters of the unsupervised feature extraction model reduces the second training time period to be smaller than the first training time period; and reducing a dimensionality of the user input vector by inputting the user input vector into the trained unsupervised feature extraction model associated with the one or more tuned hyperparameters.

\* \* \* \* \*